US007967681B2

(12) United States Patent
Ropp et al.

(10) Patent No.: US 7,967,681 B2
(45) Date of Patent: Jun. 28, 2011

(54) SYSTEM AND METHOD FOR PROVIDING ENHANCED AMUSEMENT GAME TOURNAMENT PLAY

(75) Inventors: Lonnie D. Ropp, Schaumburg, IL (US); Joe Blackwell, Worth, IL (US); Keith Johnson, Bartlett, IL (US); Dwight Sullivan, West Chicago, IL (US)

(73) Assignee: Stern Pinball, Inc., Melrose Park, IL (US)

( * ) Notice: Subject to any disclaimer, the term of this patent is extended or adjusted under 35 U.S.C. 154(b) by 1143 days.

(21) Appl. No.: 10/877,604

(22) Filed: Jun. 25, 2004

(65) Prior Publication Data

US 2005/0288803 A1 Dec. 29, 2005

(51) Int. Cl.
*A63F 13/00* (2006.01)

(52) U.S. Cl. .............................................. 463/32; 463/3

(58) Field of Classification Search .................. 463/1, 3, 463/32; 273/440

See application file for complete search history.

(56) References Cited

U.S. PATENT DOCUMENTS 4,974,857 A 12/1990 Beall et al.
5,114,155 A 5/1992 Tillery et al.
5,359,510 A * 10/1994 Sabaliauskas .................. 700/91
5,496,039 A 3/1996 Zammuto
5,755,621 A * 5/1998 Marks et al. ..................... 463/42
5,917,725 A * 6/1999 Thacher et al. ................. 700/91
6,082,887 A * 7/2000 Feuer et al. ..................... 700/91
7,070,506 B1 * 7/2006 Ropp et al. ....................... 463/29
2002/0039923 A1 * 4/2002 Cannon et al. .................. 463/42
2003/0130041 A1 7/2003 Pascal et al.

FOREIGN PATENT DOCUMENTS

WO WO 00/29084 5/2000
WO WO 0238228 5/2002

* cited by examiner

*Primary Examiner* — Peter DungBa Vo
*Assistant Examiner* — Jeffrey Wong
(74) *Attorney, Agent, or Firm* — Greenberg Traurig, LLP

(57) ABSTRACT

Enhanced amusement game tournament play is achieved by awarding prizes to one or more players maintaining a position on a threshold game score achieving, bump board listing, a prize qualifying cumulative threshold game score total, and/or a prize qualifying cumulative actual game score total wherein individual game scores are required to meet a threshold game score prior to being added to the cumulative total. These methods for awarding prizes may also include the awarding of prizes to one or more players achieving a prize qualifying individual game score and/or a prize qualifying cumulative game score total.

37 Claims, 7 Drawing Sheets

500

| position | player | cumulative score |
|---|---|---|
| 1 | Bob | 10,000,000 |
| 2 | Bill | 8,500,000 |
| 3 | David | 8,000,000 |
| 4 | Anna | 7,500,000 |
| 5 | James | 6,000,000 |
| 6 | Joe | (3,000,000) |
| 7 | Mike | (3,750,000) |
| 8 | Brian | (2,500,000) |

510 521 520

FIG. 5A

500

| position | player | cumulative score |
|---|---|---|
| 1 | Bob | 10,000,000 |
| 2 | Bill | 8,500,000 |
| 3 | David | 8,000,000 |
| 4 | Anna | 7,500,000 |
| 5 | James | 6,000,000 |
| 6 | Sue | (3,000,000) |
| 7 | Joe | (3,000,000) |
| 8 | Mike | (3,750,000) |

510 521 520

FIG. 5B

500

| position | player | cumulative score |
|---|---|---|
| 1 | Bob | 10,000,000 |
| 2 | Bill | 8,500,000 |
| 3 | David | 8,000,000 |
| 4 | Anna | 7,500,000 |
| 5 | James | 6,000,000 |
| 6 | Sue | (5,000,000) |
| 7 | Joe | (3,000,000) |
| 8 | Mike | (3,750,000) |

510 521 520

FIG. 5C

500

| position | player | cumulative score |
|---|---|---|
| 1 | Bob | 10,000,000 |
| 2 | Sue | 9,000,000 |
| 3 | Bill | 8,500,000 |
| 4 | David | 8,000,000 |
| 5 | Anna | 7,500,000 |
| 6 | James | (6,000,000) |
| 7 | Joe | (3,000,000) |
| 8 | Mike | (3,750,000) |

510 521 520

FIG. 5D

500

| position | player | cumulative score |
|---|---|---|
| 1 | Bob | 10,000,000 |
| 2 | Sue | 9,000,000 |
| 3 | Bill | 8,500,000 |
| 4 | David | 8,000,000 |
| 5 | Anna | 7,500,000 |
| 6 | Nick | (5,000,000) |
| 7 | James | (6,000,000) |
| 8 | Joe | (3,000,000) |

510 521 520

FIG. 5E

500

| position | player | cumulative score |
|---|---|---|
| 1 | David | 12,000,000 |
| 2 | Bob | 10,000,000 |
| 3 | Sue | 9,000,000 |
| 4 | Bill | 8,500,000 |
| 5 | Anna | 7,500,000 |
| 6 | Nick | (5,000,000) |
| 7 | James | (6,000,000) |
| 8 | Joe | (3,000,000) |

510 521 520

FIG. 5F

SYSTEM AND METHOD FOR PROVIDING ENHANCED AMUSEMENT GAME TOURNAMENT PLAY

FIELD OF INVENTION

This invention relates to the operation of amusement games and, more particularly, to a system and method for providing enhanced amusement game tournament play.

BACKGROUND

Amusement games are generally known in the art. However, known amusement games suffer various deficiencies. For example, players of an amusement game often lose interest in playing the amusement game once they have mastered the play of the particular amusement game. Therefore, in an effort to maintain the interest of players of amusement games and/or to increase the profitability of amusement games, amusement games are currently being offered with tournament play capabilities.

By way of example, U.S. Pat. No. 6,082,887 describes a game machine that includes a tournament mode for conducting automated tournaments. In the tournament mode, a plurality of tournament games are playable by a plurality of players on the game machine. Each of the plurality of tournament games generates a total player score upon completion of game play. The player scores in each of the plurality of tournament games are used to determine the winner.

Similarly, U.S. Published Patent Application 2002/0039923 describes a tournament gaming system that includes one or more gaming machines programmed for play of at least one tournament game. The gaming machines are linked through a host computer. Qualification for tournament play is effectuated through participation in one or more primary games programmed for tournament play.

Still further, PCT Published Patent Application WO 0029084 describes a tournament game system and method by which players may compete in international, regional, national, and local electronic game tournaments over a network, such as the Internet. A host server coupled via the network to multiple local servers controls the various tournaments. The local servers are each connected to a set of local games at each locale.

Yet further, U.S. Published Patent Application 2003/0130041 describes a dynamic tournament gaming method and system that includes the provision of a plurality of gaming terminal selectively interlinked with a host terminal so that players desiring to participate in group tournament play can be notified of the opportunity and provided with the choice to play or not. If a player chooses to play, they provide an entry fee into the terminal and await the start of the tournament. Upon the start of the tournament by the host terminal, the player will play the tournament game to accumulate as many points as possible.

Additional systems and methods for providing amusement game tournament play may also be found in PCT Published Patent Application WO 0238228 and U.S. Pat. Nos. 5,496,039, 5,114,155, and 4,974,857.

As described above, in conventional tournament play, a player may pay an entry fee and play the amusement game for the chance to win cash and/or prizes. The cash and/or prizes are strictly awarded to those players that have a highest score during the tournament. This method for awarding players, however, suffers the disadvantage in that it attracts only those players that have mastered the amusement game, i.e., only those players that feel that they can actually compete for the cash and/or prizes. Accordingly, tournament play that limits the awarding of cash and/or prizes to only those players that have a highest score fails to maximize the interest of players in an amusement game and/or the profitability of an amusement game.

SUMMARY OF THE INVENTION

To address this and other deficiencies in known systems and methods for providing amusement game tournament play, described hereinafter is an system and method for providing enhanced amusement game tournament play. While described in the context of a pinball machine, i.e., an amusement game having an inclined playfield supporting a plurality of game features and a rolling ball and wherein game play allows a player to earn a game score by causing the rolling ball to interact with the game features, the invention is not intended to be so limiting. Rather, those of ordinary skill in the art will appreciate that the teachings that follow may be utilized to provide enhanced amusement game tournament play to any type of amusement game, such as by way of example only, electronic dart boards, video games, etc.

A better understanding of the objects, advantages, features, properties and relationships of the system and method for providing enhanced amusement game tournament play will be obtained from the following detailed description and accompanying drawings which set forth illustrative embodiments that are indicative of the various ways in which the principles of the disclosed system and method may be employed.

BRIEF DESCRIPTION OF THE DRAWINGS

The system and method for providing enhanced amusement game tournament play is described with reference to the following drawings in which:

FIG. 5 illustrates a further method for using threshold game scores to provide enhanced amusement game tournament play.

DETAILED DESCRIPTION

Figure 1:
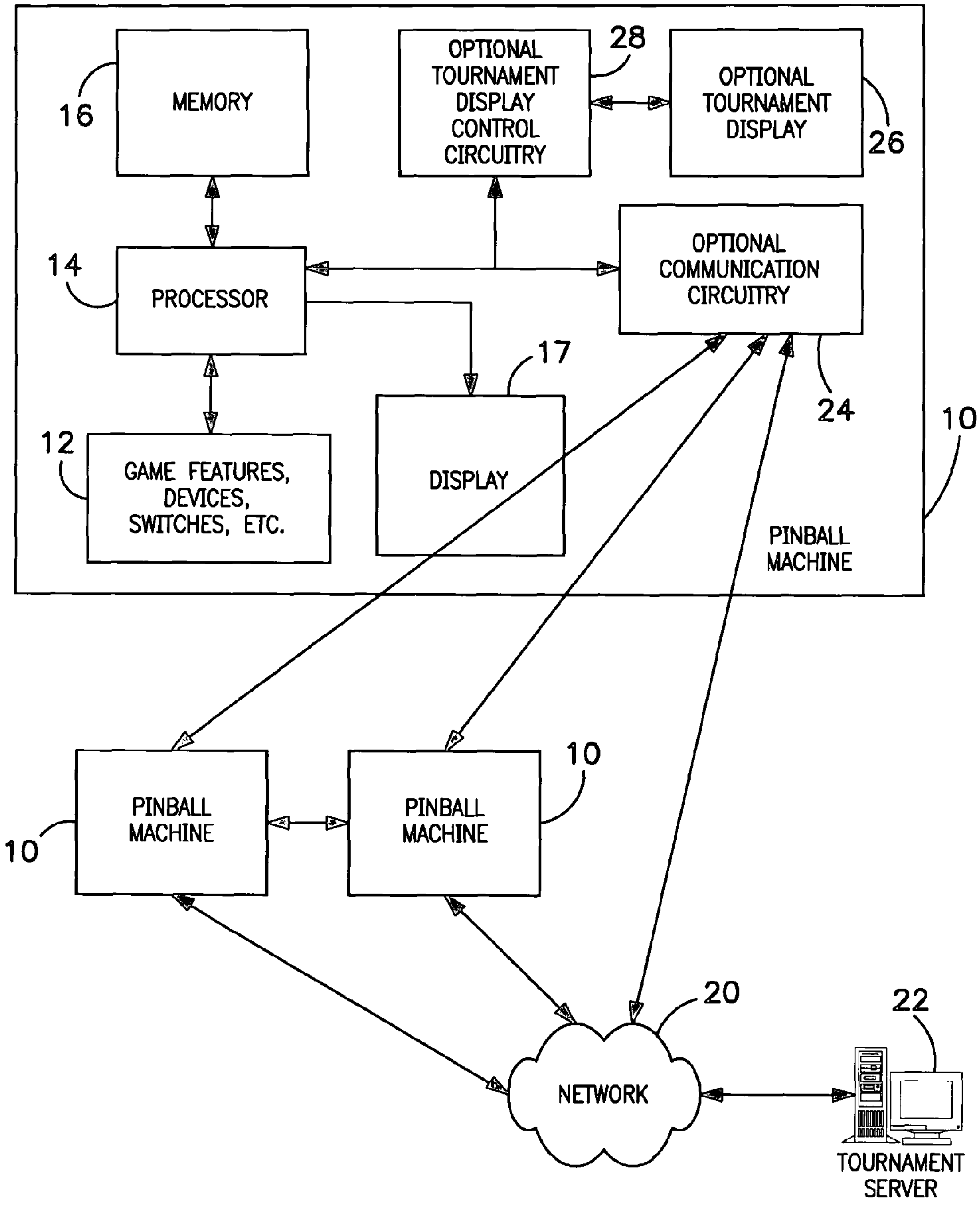
FIG. 1 illustrates exemplary components of a pinball machine and exemplary pinball machine networks.

With reference to the figures, a pinball machine 10 generally includes a cabinet which houses an inclined playfield. The playfield supports a game piece such as a rolling ball and has a plurality of playfield features and devices 12. These features and devices 12 may take a number of forms including, but not limited to, bumpers, targets, various lights or other illumination devices, three-dimensional objects or figures, targets which are fixed or moveable, elements that are capable of selectively holding and releasing the ball, etc. Certain of the features and devices 12 allow points to be scored when activated by the ball.

When play of the pinball machine commences, typically by the player placing credits into the pinball machine, which may be placed into the pinball machine by, for example, depositing money or tokens, using a swipe card, etc., the ball is introduced into the playfield. The ball may be introduced onto the playfield for, by way of example only, shooting the ball with a ball propelling element such as a plunger. The ball enters the playfield via a shooter lane that is positioned along a side of the playfield such that the ball travels from a lower end of the playfield to an upper end of the playfield. Ball introduction mechanisms may be of the manually-actuated type or, alternatively, may be automatically actuated in response to depression of a shooter button mounted to the front of the cabinet. Once the ball is positioned on the playfield, the ball tends to roll, under the force of gravity, in the direction of a pair of flippers located at a bottom end part of the inclined playfield. The flippers, which are activated by buttons on the sides of the cabinet, are used by the skilled player to propel the ball back into the playfield to prevent the ball from exiting the playfield via an outhole. The outhole can be considered to be the entrance to a path by which to the ball is returned to the ball launching mechanism. Typically, the outhole is positioned adjacent to a ball trough that is used to feed balls to the ball launching mechanism. In some circumstance, it may be desired to provide a player with the ability to activate posts or the like to prevent the ball from exiting the playfield via exit lanes or via a space between the flippers. It will therefore be appreciated that a skilled player can use the flippers (and posts if provided) to prevent the ball from leaving the playfield such that play of a pinball game 10 can be extended indefinitely since the sole means by which the ball can exit the playfield is preferably positioned behind the flippers, i.e., an outhole is located adjacent to the lower end of the playfield.

To protect the playfield, the playfield is generally covered by a transparent panel of glass or plastic through which a player may view the playfield and its contents. Typically, the pinball machine 10 also includes a backbox that is mounted generally above the playfield and usually at an end thereof opposite a player station which is adjacent the location of the flippers and plunger. The backbox would generally include circuitry such as a processor 14 linked to input devices such as switches, buttons, etc., and output devices such as solenoids, a display 17, lights, etc. which are located on the playfield, positioned in the backbox, or otherwise associated with the pinball machine. Instructions for controlling the operation of the pinball machine 10, via the processor 14, are stored in a memory 16. Other locations for this circuitry are also contemplated such as, for example, under the playfield.

For use in enhancing the play of the pinball machine 10, the pinball machine 10 may be provided with the ability to allow a player to select the mode of play desired, e.g., tournament play mode or normal play mode. While described in the context of allowing the player to choose between these types of game play modes, it is to be understood that the pinball machine 10 need not include all game play mode variations.

In normal play mode, conventional game rules are typically in effect. For example, during normal play, the pinball machine 10 may be equipped for auto-percentaging and the player may be provided with the opportunity to earn extra balls by scoring points or activating targets. As will be readily understood, an earned extra ball allows the player to place an additional ball onto the playfield beyond the number of rolling balls that are normally allotted for game play when game play commences. Similarly, during normal play, the player may be provided with the opportunity to earn a chance to replay the game or to earn extra game credits, for example, by activating a particular game feature, by achieving a particular point score, and/or by having a point score component that matches a randomly generated number.

In tournament play mode, a set of game rules that differ from those offered during normal play might apply. For example, it may not be desired to allow a player to earn extra balls, replays, or game credits during tournament play. Similarly, to remove randomness from game play, it might be desired to award mystery game play features in a set order rather than in a random order as is typically done in normal play. Still further, percentage game features might not be automatically advanced as they are during normal play.

To allow a player to select between normal play or tournament play, the pinball machine 10 may be provided with player activatable switches that function to inform the pinball machine 10 of the type of play desired in order that the pinball machine 10 can adjust its rules of play. Commencement of game play may also require the pinball machine 10 to have game credits. In some instances, the pinball machine operator may select how money credits are bought for the amount of cash/token(s) deposited with the pinball machine 10. The amount of credits for playing each of the various types of games may also be settable by the operator of the pinball machine. For example, normal play may require 2 credits while tournament play may require 4 credits. Thus, when the player selects which type of game play mode the player desires, the pinball machine 10 will deduct the credits required for the game play mode selected from the total credits found on the pinball machine 10. Indication of the desired type of game play may be provided, by way of example only, with a player activating a "start" button located in the front molding of the game cabinet for normal play or a "tournament" button, also provided on the front molding of the game cabinet, for tournament play.

In tournament play, players may compete against one another to determine which player(s) have achieved a "reward earning pinball game play score" during a given period of time—as will be described in greater detail below. Thus, in tournament play, the pinball machine 10 may track those players that have a "reward earning game play score," e.g., a game play score that ranks as a high score and a predetermined number of "bump-n-win" game play scores. Relevant game play scores, player information, etc., may thus be maintained in a memory device 16.

Figure 2A:
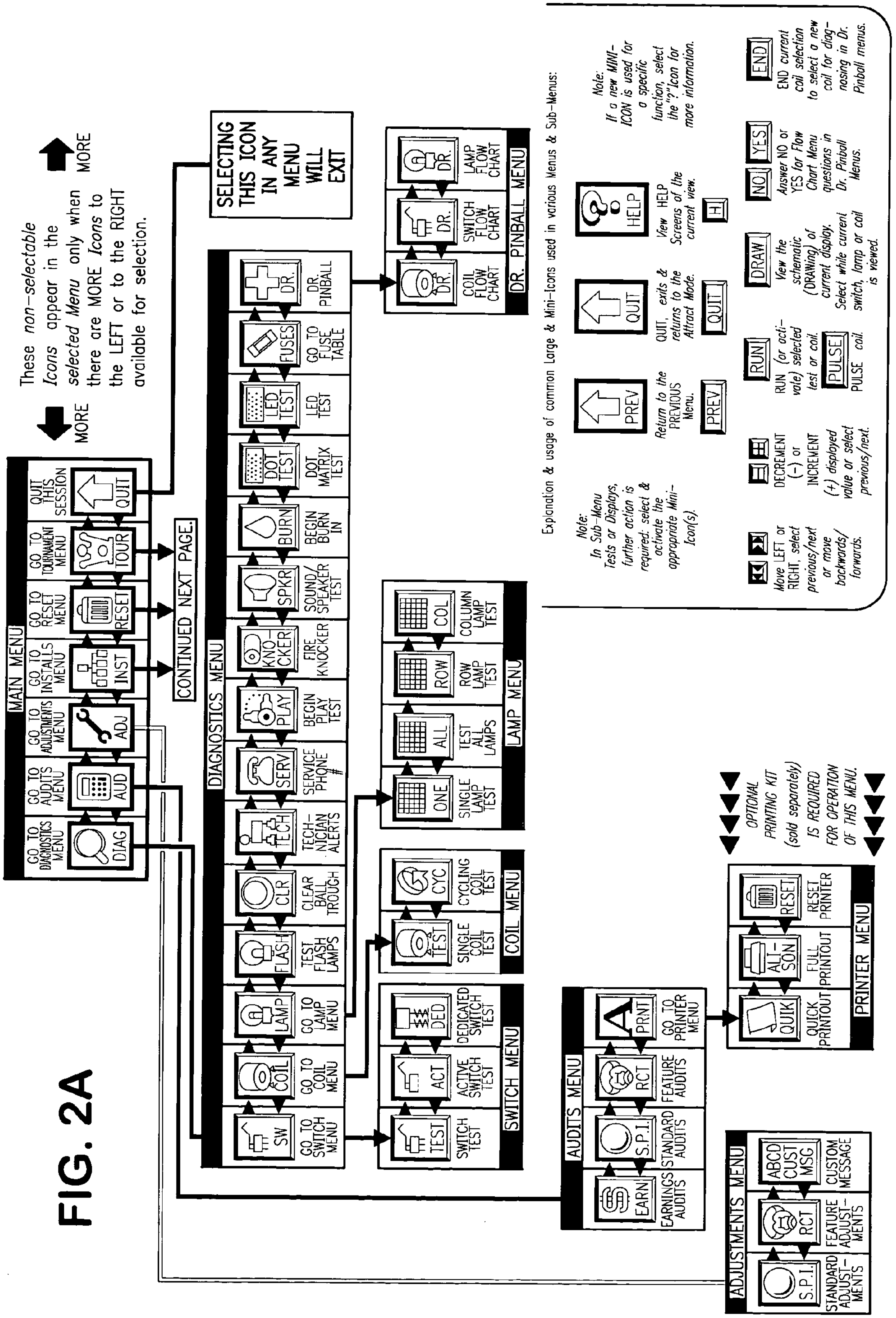
FIGS. 2*a* and 2*b* illustrate an exemplary menu system for, among other things, setting up a pinball machine for tournament play and for accessing information regarding completed tournaments.
Figure 2B:
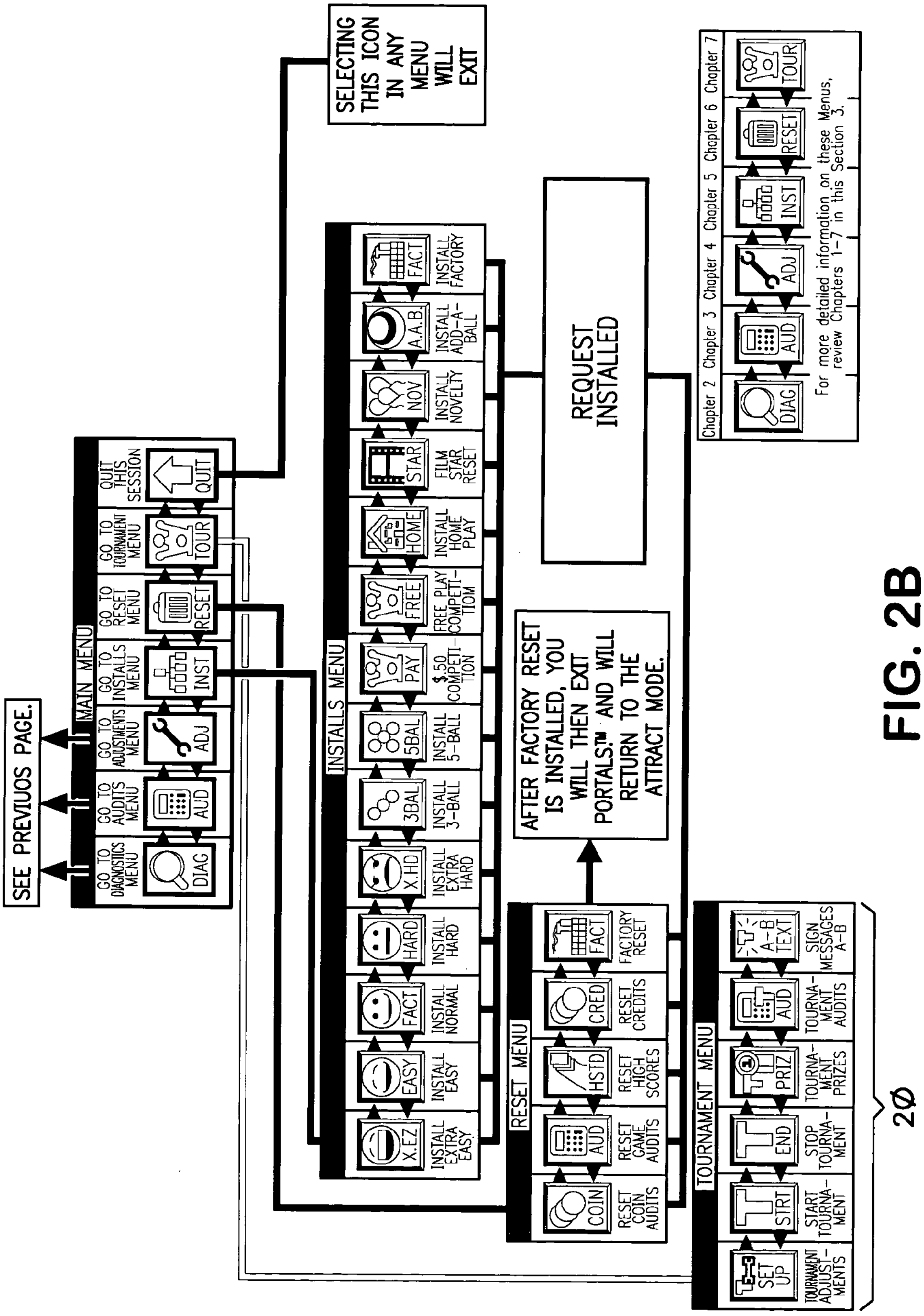

To set-up the pinball machine 10 to allow for tournament play, the operator may interact with a menu system or the like whereby operator input may be utilized to establish one or more of the tournament parameters. In the event that one or more of the parameters are not operator set, default values can be provided within the operating software of the pinball machine 10. An exemplary menu system is illustrated in FIGS. 2*a* and 2*b*, by which the operator may gain access to various tournament set-up menu icons 20. It will be appreciated that the menu icons could be displayed in a display 17 of the backbox and a menu access button, key-switch, or the like, could be located within the game cabinet behind a locked, access door, the activation of which would allow access by the game operator or owner to the menu system. Navigation of the menu system (which could also provide accesses to diagnostic functions, etc. as well as set-up features) could be accomplished by the operator activating additional buttons on the pinball machine, for example, the flipper buttons could be used to navigate left and right and the start button to select a menu item of interest for further processing in accordance with the menu software.

By way of example, the set-up menu may be used to allow the pinball machine operator to set adjustments for tournament play. Exemplary adjustments that may be set by the operator include, but are not limited to: 1) prize pool base (for tournaments in which prize units are to be distributed, e.g., tickets, tokens, cash, etc.—this establishes the initial prize pool); 2) prize pool increment (i.e., the amount by which the prize pool is to be incremented—which may be set to zero for a static prize pool); 3) prize pool increment event (e.g., allows the operator to determine what event increments the prize pool, for example, the prize pool is incremented when tournament game play commences); 4) prize pool maximum value (i.e., the ceiling for the prize pool); 5) number of prizes to award (i.e., how many prize winning play scores are to be maintained in tournament play); 6) finishing positions that are to share in the prize pool (e.g., if five prizes are to be awarded, only the top three tournament play high scores may be set to share in the prize pool, the number of "bump-n-win" scores, etc.); 7) prize pool distribution percentages (e.g., what percentage of the prize pool is to be distributed to the designated number of prize pool recipients); 8) prize descriptors (e.g., to designate that the prize pool is to be awarded in cash, tickets, etc. and/or to enter textual descriptions for prizes such as t-shirts, a free party, etc. that may be awarded in addition to or in cases where it is elected not to have a prize pool—means may also be provided to designate which award position is to be provided with each prize entered in this fashion); and 9) whether or not current leader information is to be displayed (e.g., whether names of tournament leaders and potential prizes to be won by those leaders are displayed). The operator may also be provided with the ability to set text messages that are to be displayed for the purpose of attracting potential game players. Access to these set-up features in the menu system may be accomplished, for example, by the pinball machine operator selecting the "tournament adjustments" menu item of FIG. 2 which will cause the pinball machine system to display one or more of the above parameters to allow said parameters to be operator set or modified. For example, by activating buttons associated with the pinball machine 10, the operator can set-up parameters of interest by using buttons to select an item from a list, increase or decrease values, enter alphanumeric characters, etc.

In addition to the game parameters above-noted, the menu system may also be utilized to establish a start date of the tournament and an end date of the tournament. The start date and the end date may be displayed so as to inform potential players that a tournament is about to commence, is in progress, or when it is to end. When the tournament play period is set, the pinball machine may automatically keep track of player game play scores during the designated period, provided the pinball machine has a real-time clock. In the case where the pinball machine does not have a real-time clock, the pinball machine operator may have to manually start and end tournament play. To allow the pinball machine operator to manually start and stop tournament play, menu icons "start tournament" and "stop tournament," respectively, can be selected by the operator. Thus, when the "start tournament" menu-icon is selected, the pinball machine tracks tournament game play statistic until the "stop tournament" menu-item is selected to end tournament play.

Once a tournament is completed, the operator may access information from memory 16 that is relevant to the completion of the tournament to thereby allow the prizes to be distributed by the operator. To this end, the operator may access tournament prize information via selection of the "tournament prizes" menu icon and use buttons to navigate, for example, a list of prize winners. Information collected by the pinball machine 10 relevant to the awarding of prizes may include, but need not be limited to, a prize winner name, a player-provided pin number (by which players identify themselves to the operator as a winner), and the prize to be given to each player determined to be a prize winner. Player identification information may be collected when a player commences game play or may be collected after game play, for example, only when the player qualifies as a potential prize winner. The information may be manually entered by the player, using the flipper buttons to scroll through and select alphanumeric characters, using a key-pad such as one typically found on a phone, using a card on which the information is encoded (in which case the pinball machine 10 would have a card reader), etc. While the operator may manually maintain a list of prize winners for a given tournament (for example it could be downloaded via a printer port for use in providing a hard-copy), it is contemplated that the pinball machine 10 may also display prize winners for one or more past tournaments so that players may inspect the display to know that they have won a prize. Still further, the operator may access the menu system to retrieve tournament audit information. For example, the pinball machine may track information such as: 1) plays (e.g., provides the total number of normal and/or tournament games played); 2) game earnings (e.g., provides the earnings from normal play and/or tournament play; and 3) number or tournaments played to date. Additional audit information may include net earnings (tournament cash less payout), prize pool total, and accumulated information concerning plays, earnings, etc. When collecting audit information concerning accumulated information, it is desired that this audit information not be capable of being reset.

While described in the context of a single pinball machine 10, it will be appreciated that the features of tournament play can also be implemented in a system of pinball machines connected via a network 20. In this case, the tournament game play scores on each of the networked pinball machines 10 would be used to determine which players qualify as prize winners. The game play scores utilized in determining prize winners as well as player information could be reported to a central repository 22 such as a server. Alternatively, information can be reported to and locally stored on one or more of the pinball machines 10 (e.g., one of the pinball machines can act as a server). By way of example only, each pinball machine could have circuitry 24, such as a modem or the like, by which game play scores and player information is transmitted to a central server via the network 20 which central server, as noted, could be located on one of the pinball machines 10 or remotely at an address 22 designated by a tournament sponsor and/or operator of the pinball machines. Furthermore, it will be appreciated that this address could be a designated Internet Web site address. It will also be appreciated that the pinball machines 10 can be wired directly to one another to exchange information. Still further, it is to be understood that any communication links between pinball machines 10 can be arranged in a variety of different manners, such as hub and spoke, circular, etc. Still further, tournament play information, such as potential prize winners during an on going tournament, past prize winners, etc., could also be reported back to each of the pinball machines when maintained at a central location for displayed on one or more displays associated with the respective pinball machines 10.

In some instances it may be desirable to provide tournament play as an add-on feature to a pinball machine 10. In this instance, it is contemplated that the pinball machine would be pre-programmed to allow for both normal play and tournament play, however, without an additional upgrade, the ability to activate tournament play would be inhibited. For example, if it is desired that a tournament play marquee 26 be utilized in connection with the pinball machine to advertise tournament play and/or tournament play information, the ability to activate tournament play would be inhibited in the absence of such a marquee 26. The presence of a marquee 26, which may be a dot matrix display, LCD display, or the like, would be sensed by the pinball machine 10 and would, in essence, act as a switch to allow for the activation of tournament play. Disconnecting the marquee 26 could also cause tournament play to be paused until such time as the marquee 26 is returned to operation. For allowing such a marquee to be easily installed, the pinball machine 10 may be provided with mounting posts for accepting driving circuitry 28 for the marquee 26, which would also be in communication with the operating circuitry of the pinball machine 10, as well as spottings for locating anchors used to attach the marquee 26 to the back box, game cabinet, or the like.

For awarding game play prizes in an enhanced amusement game tournament play mode, the system and method preferably tracks not only one or more players that have achieved a highest score (i.e., a high score when compared to scores relative to the other players), but also one or more players that have achieved at least a "bump-n-win" score. In this regard, a "bump-in-win" score is preferably a game play threshold score selected to maximize attractiveness of the tournament game to all players, i.e., it is game play threshold score that would not appear to be so high, or unattainable, that players that have not mastered the amusement game would be intimidated from playing the amusement game in the tournament mode and not so low that players would realize that they would likely get bumped from the "bump-n-win" prize list in favor of another player. Thus, the "bump-in-win" threshold score is preferably selected for the purpose of achieving a desired churn rate—wherein only a given percentage of plays likely result in a player's score being one that qualifies the player as a "bump-n-win" prize winner.

Figure 3:
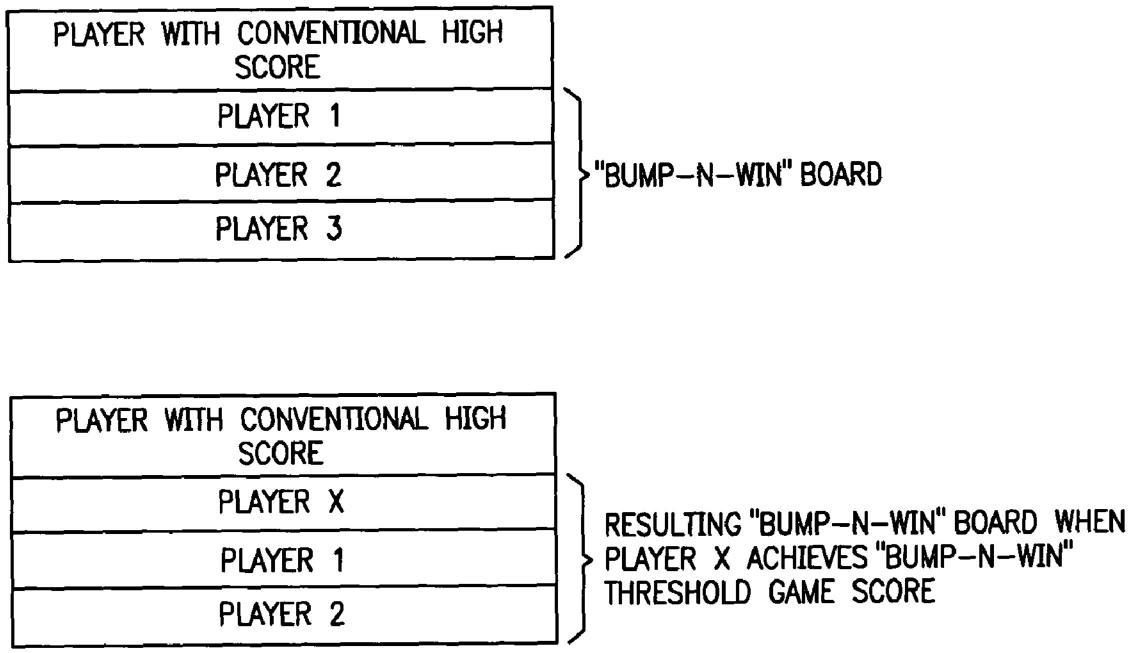
FIG. 3 illustrates an exemplary "bump-n-win" qualification list for tracking a predetermined number of threshold game score achieving players.

By way of more particular example, in the enhanced amusement game tournament play not only will prize(s) be provided to one or more players that achieve a conventional tournament win, e.g., the one or more players that achieve the highest score at the end of tournament play relative to the other players, but also to those players that place on the "bump-n-win" board—i.e., threshold game score prize winners. To place on the "bump-n-win" board, a player is required to achieve a threshold score—the "bump-n-win" score. When a player achieves that threshold score, i.e., their game play score is compared against the threshold score and must be equal and/or greater than that threshold score, that player is moved to the top of the "bump-n-win" board and players previously on the "bump-n-win" board are moved one position lower, with the result being that the player holding the last potential prize winning spot on the "bump-n-win" board is removed from that prize winning spot, as illustrated in FIG. 3. It is also contemplated that the bumping from the "bump-n-win" board can occur from the bottom up, i.e., the player achieving the "bump-n-win" score is added to the bottom of the "bump-n-win" board and the players moved up one spot until the player holding the top of the "bump-n-win" board is removed from that potential prize winning spot. In sum, it is contemplated that the player achieving a "bump-n-win" score may replace any previously qualifying player so desired from the "bump-n-win" board.

During the course of tournament play, it is contemplated that the "bump-n-win" score may remain static. It is also contemplated that the "bump-n-win" score may be changed at periodic intervals, for example, at the start of each new game play. In this regard, the changing of the "bump-n-win" score may consider previous scores attained by players to, for example, adjust the "bump-n-win" score up or down in an effort to realize the desired chum on the "bump-n-win" board. Preferably a player is shown the "bump-n-win" threshold score the player needs to achieve to qualify as a potential "bump-n-win" winner before each game is played to thereby entice the player to play the game.

Figure 4:
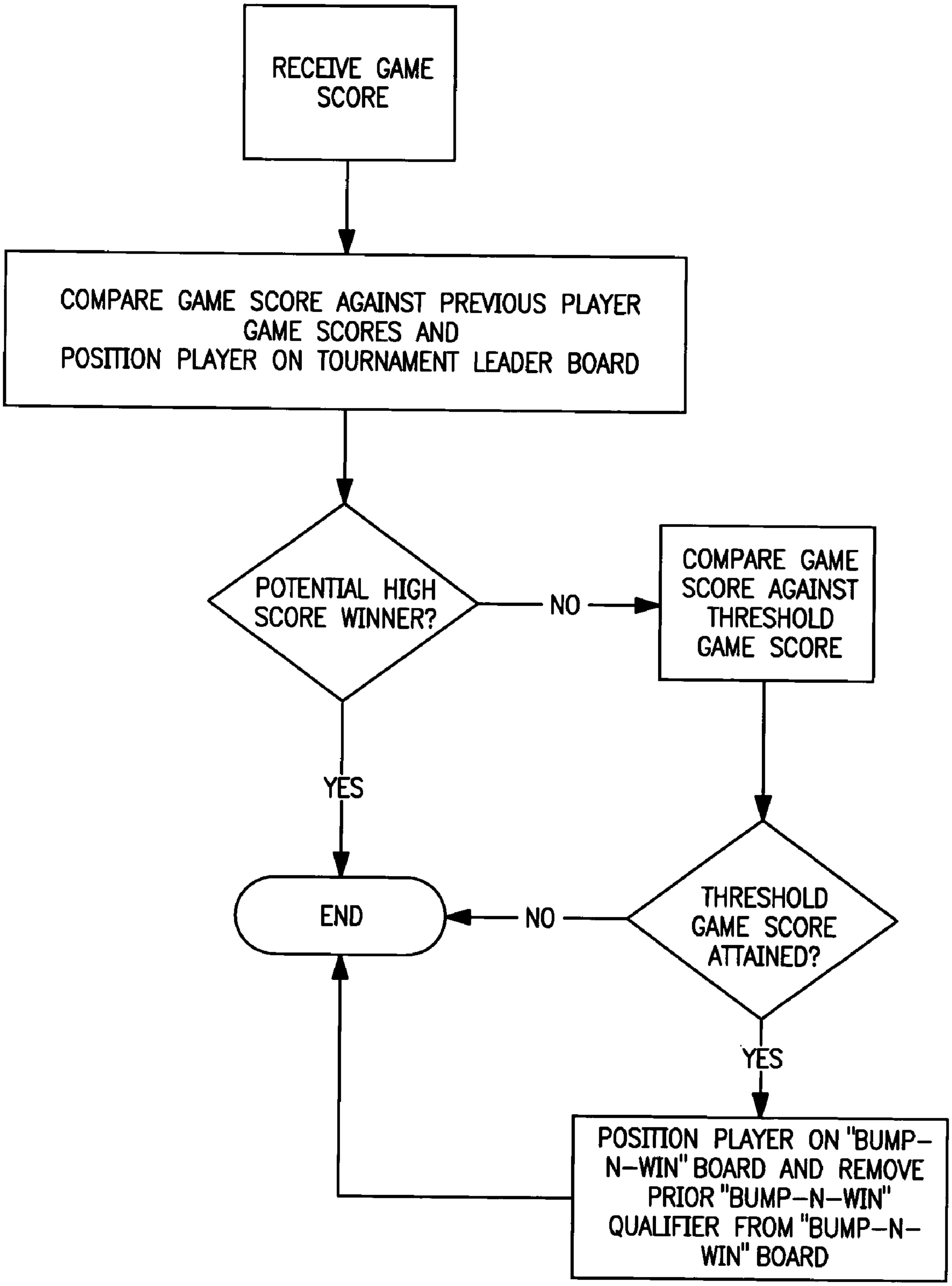
FIG. 4 illustrates in flow chart form an exemplary method for determining potential enhanced amusement game tournament winners.

During such enhanced tournament play, it may be preferred that a player be limited to one prize receiving category as a result of a single play of a tournament game. For example, as illustrated in FIG. 4, if the player attains a game play score that would qualify the player as a potential "high score" prize recipient (when that score is compared against the scores of previous players), that player will not be eligible as a potential "bump-n-win" prize recipient even if their game play score attains the "bump-n-win" threshold score.

In the various tournament systems described, the "bump-n-win" threshold score may be determined and maintained by a tournament award tracking module that is located at a centralized location that is in communication via a network with a plurality of amusement games. In this case, the award tracking module will receive and process game scores from the amusement games as described above. Alternatively, the tournament award tracking module may be distributed wherein a threshold score may be determined and maintained by individual amusement games within a network and wherein a centralized "bump-n-win" board is provided "bump-n-win" qualifying player data from each amusement game when that amusement game determines, by comparing game scores achieved on that amusement game against a local "bump-n-win" threshold game score, that a player should be added to the "bump-n-win" board. Still further, the tournament award tracking module may be local to an amusement game whereby the threshold score is determined and maintained by an individual amusement game, especially in the case where the tournament is executed on one amusement game alone.

For awarding prizes, any desired payout ratio may be utilized. For example, the player or players that win the tournament in the conventional manner, i.e., by posting a highest score relative to the other players, may be awarded half of a prize pool in amounts that depend upon the number of players that will share in that half of the prize pool and a percentage based upon their winning position. The remaining prize pool amount may then be split, preferably equally, by the players that have ended up on the "bump-n-win" board when the tournament concluded. Alternatively, the entirety of the prize pool may be shared by the players with the highest scores with the "bump-n-win" winning players getting other prizes. Thus, it will be appreciated that the awarding of prizes may be done in any manner believed to maximize player participation in the tournament. It will also be appreciated that an enhanced tournament may award prizes using only the "bump-n-win" board, i.e., no player high scores are tracked for purposes of awarding prizes.

In a further variation, it is contemplated that prizes may be awarded based upon the cumulative total of threshold scores achieved by players during a tournament time period. By way of example, with reference to FIGS. 5A-5F, the system may be configured to provide a listing (500) of players that have achieved a threshold score during play—at least partially ranked by their cumulative threshold beating scores. Included in the listing (500) would be a listing of those players that are currently qualified as potential cumulative threshold score prize recipients (510), e.g., the top five cumulative score totals, and possibly the remaining players that are presently not qualified for an award. Preferably, such a listing (500) would be presented in between plays of the amusement game whereby players can see where they stand on the listing (500) relative to other players. As discussed previously, it is also preferred that potential players of the amusement game be allowed to view the current threshold score to achieve (which may be changed on a game by game basis as discussed previously).

During tournament play in accordance with this variation, if a player beats the current threshold score, the player qualifies to have their name added to the listing (500). After qualifying a player may be required to enter their name or other identifier and a password. If this name with this password was already on the listing (500) then their cumulative threshold achieving score is augmented by the threshold score that was just achieved by the player. In this variation, it does not matter what the player's actual total score was for the game, it is only the threshold score value that is added to their cumulative, running threshold score total.

Still further, the listing (500) may include a predetermined number of positions (520), i.e., a "bump-n-win" board of, for example, a depth of three, that are just below the listing of those players that are currently qualified as potential cumulative threshold score prize recipients (510). In this manner, when a player first achieves a threshold score, that player will be put on the listing (500) in a predetermined position (521) within the list of predetermined positions (520), for example, a position in the listing (500) just below the potential cumulative threshold score prize recipients (510). As new players achieve threshold scores, those players will enter the listing (500) in the predetermined position (521), possible moving the players previously listed in the positions (520) and effectively bumping one player from the listing. It is to be appreciated that players may be added and/or removed from the positions (520) using any of the methods discussed previously. In this manner, the predetermined position (521) is available for new players to get onto the listing (500)—i.e., by achieving the threshold score—and start working their way to one of the potential cumulative threshold score prize recipient positions (510). As will be seen, the player, once being placed onto the listing (500), can also be bumped by further players achieving a threshold score.

By way of example, FIGS. 5A-5F illustrate changes in the listing (500) over the course of a tournament. In this example, the listing (500) includes eight players where the top five positions are currently qualified as potential cumulative threshold score prize recipients (510). At the time shown in FIG. 5A, each of Bob, Bill, and David have played three games, Anna and James have played two games, and Joe, Mike, and Brian have played one game each. The total cumulative score of each of the first five players determines their ranking within the listing (500). Below the listing positions of those players that are currently qualified as potential cumulative threshold score prize recipients is a "bump-n-win" board (520). In the illustrated example, Joe, with a score of 3,000,000, was the last player to achieve a threshold score, the threshold score being 3,000,000. With respect to the listing (500) it may be preferred that the cumulative scores of the players in the positions (520) not be publicly displayed, but be viewable by the player upon entry of their password. In this manner, as will be appreciated from the description that follows, the player may be motivated—based upon their current cumulative threshold achieving scores vis-à-vis the cumulative scores of the players in the potential prize winning positions (510)—to play the amusement game again in an attempt to improve their position in the listing (500) before they get bumped from the listing (500) by other players achieving a threshold score.

Turning to FIG. 5B, assuming Sue played a game during the tournament and was the next person to achieve a threshold score, e.g., Sue attaining a score of seventeen million versus a threshold of three-million. In such a case, Sue would enter the predetermined position (521) of the "bump-n-win" board positions (520) and would effectively bump Brian from the "bump-n-win" board (520) and, therefore, the listing (500). Notice that Sue's cumulative score at this time is the threshold score, i.e., three-million and not the seventeen-million that Sue actually scored.

Now, turning to FIG. 5C, assuming Sue was again the next person to achieve a threshold score during tournament play, the threshold score being two-million in this example. By being a player that beat a threshold score, Sue would be placed into the predetermined position (521) which, since she occupies that position already, will not result in any further players being bumped from the "bump-n-win" board positions (520). Sue's cumulative score is augmented with the threshold score and reflects a total threshold achieving score of five-million. As can be seen, since this total cumulative score is not sufficient to place Sue into the list of positions that are currently qualified as potential cumulative threshold score prize recipients (510), i.e., her cumulative score of five-million is still less than James' cumulative score of six-million, it is possible for Sue to be moved toward a bump spot within the "bump-n-win" board (520) upon a further player achieving a threshold score.

Turning to FIG. 5D, it is again assumed that Sue was the next person to achieve a threshold score during tournament play, the threshold score being four-million in this example. In this case, Sue's cumulative score is augmented with the threshold score and reflects a total cumulative score of nine-million which is sufficient to place Sue onto the list of positions that are currently qualified as potential cumulative threshold score prize recipients (510), i.e., her cumulative score of nine-million is less than Bob's cumulative score of ten-million but more than Bill's cumulative score of eight-million-five-hundred-thousand. As a result of Sue being moved into a position that is currently qualified as a potential cumulative threshold score prize recipient (510), the overall listing (500) is adjusted and James is moved into the predetermined position (521) where he is in danger of being bumped from the "bump-n-win" board positions (520) and the listing (500) should one or more other players achieve a threshold score.

Turning to FIG. 5E, assuming now that Nick was the next person to achieve a threshold score during tournament play, e.g., five-million. In such a case, Nick would enter the predetermined position (521) and would effectively bump Mike from the listing (500). Notice that Nick moves into the predetermined position (521) even though his cumulative threshold score at this time is less than the cumulative threshold score of James who previously occupied the predetermined position (521).

Turning to FIG. 5F, assuming that David was the next person to achieve a threshold score during tournament play, e.g., four-million. In this case, David's cumulative score is augmented with the threshold score and reflects a total cumulative score of twelve-million. The listing (500) is updated accordingly. If the tournament then ended, David would win the top prize, Bob the second, and Sue the Third. During this example tournament, David played a total of 4 times, Bob, Bill, and Sue have played 3 games each, Anna and James have played 2 games each, while Joe, Mike, Brian, and Nick have played 1 game each.

While the foregoing describes providing enhanced tournament play using cumulative threshold achieving scores, it will be appreciated that enhanced tournament play may also track and award prizes based upon cumulative actual scores achieved by players. Still further, when determining cumulative actual scores achieved by players, consideration may be given to whether or not an actual score achieved by a player meets a threshold score for the game just played prior to adding the actual score to that player's cumulative actual score.

As will be apparent from the example illustrated in FIG. 5, the listing (500) can be very volatile with just a few people playing. Thus, this enhanced tournament variation has the advantage of getting players to play early and often because the more they play the more they will increase their running cumulative threshold achieving score total and, therefore, their chance of winning. Also as players are knocked down the listing (500) the amount they will need to play to get back into a prize earning position will be small if they do it sooner rather than later. This enhanced tournament variation also has the advantage of discouraging players from putting more than one name on the listing (500) at a time because that would split their score, i.e., not improve the desired overall cumulative threshold achieving score. This enhanced tournament variation will additionally encourage quicker play because when the player achieves the threshold score they may realize they do not have to play any more and just quit, enter their name, and move on to the next game.

While specific embodiments of the invention have been described in detail, it will be appreciated by those skilled in the art that various modifications and alternatives to those details could be developed in light of the overall teachings of the disclosure. For example, while described in the context of pinball machines, it will be understood that the teachings set forth herein may be utilized in connection with any type of amusement game, such as an electronic dart board, video game, etc. Accordingly, the particular arrangement disclosed is meant to be illustrative only and not limiting as to the scope of the invention which is to be given the full breadth of the appended claims and any equivalents thereof.

What is claimed is:

1. A non-transitory computer readable media embodied in a non-transient memory device having stored thereon instructions executable by a processing device, the instructions performing steps for conducting a multiple player tournament utilizing an amusement game, comprising:

for each of the multiple players playing the amusement game during the tournament:

firstly comparing a game playing score achieved by a current player of the amusement game against game playing scores achieved by previous players of the amusement game during the tournament to determine if the game playing score achieved by the current player of the amusement game qualifies the current player of the amusement game as a potential high game playing score prize recipient; and secondly comparing the game playing score achieved by the current player of the amusement game against a threshold game playing score for the tournament to determine if the current player of the amusement game has achieved a game playing score that qualifies the current player of the amusement game as a potential threshold game playing score prize recipient only in response to it being determined that the current player of the amusement game failed to achieve a game playing score that qualifies the current player of the amusement game as a potential high game playing score prize recipient;

wherein the threshold game playing score for the tournament has a non-zero value that is initially established prior to the tournament and prior to game playing scores being achieved by any of the multiple players of the amusement game during the tournament.

2. The computer readable media as recited in claim 1, wherein a player achieving a game playing score that qualifies the player of the amusement game as a potential threshold game playing score prize recipient causes a removal of a previously qualified potential threshold game playing score prize recipient from a listing of qualified potential threshold game playing score prize recipients.

3. The computer readable media as recited in claim 1, wherein a player achieving a game playing score that qualifies the player of the amusement game as a potential threshold game playing score prize recipient causes an upward movement of previously qualified potential threshold game playing score prize recipient within a listing of qualified potential threshold game playing score prize recipients and removal of a previously qualified potential threshold game playing score prize recipient that occupied a top spot within the listing of qualified potential threshold game playing score prize recipients.

4. The computer readable media as recited in claim 1, wherein a player achieving a game playing score that qualifies the player of the amusement game as a potential threshold game playing score prize recipient causes a downward movement of a previously qualified potential threshold game playing score prize recipient within a listing of qualified potential threshold game playing score prize recipients and removal of a previously qualified potential threshold game playing score prize recipient that occupied a bottom spot within the listing of qualified potential threshold game playing score prize recipients.

5. The computer readable media as recited in claim 1, wherein the threshold game playing score for the tournament remains constant throughout the tournament.

6. The computer readable media as recited in claim 1, wherein the threshold game playing score for the tournament periodically changes throughout the tournament.

7. The computer readable media as recited in claim 6, wherein the threshold game playing score for the tournament is manually changed.

8. The computer readable media as recited in claim 6, wherein the threshold game playing score for the tournament is automatically changed.

9. The computer readable media as recited in claim 1, wherein the threshold game playing score for the tournament is selected to achieve a desired churn of potential threshold game playing score prize recipients.

10. The computer readable media as recited in claim 9, wherein the instructions periodically adjust the threshold game playing score for the tournament when it is determined that the desired churn of potential threshold game playing score prize recipients is not being achieved.

11. The computer readable media as recited in claim 1, wherein the game playing score achieved by the current player of the amusement game is received at a central location which performs the step of comparing.

12. The computer readable media as recited in claim 11, wherein the game playing score achieved by the current player of the amusement game is transmitted to the central location via a network.

13. The computer readable media as recited in claim 12, wherein the network comprises the Internet.

14. The computer readable media as recited in claim 1, wherein the instructions display the threshold game playing score for the tournament to attract potential players of the amusement game.

15. The computer readable media as recited in claim 1, wherein the amusement game comprises a pinball machine.

16. The computer readable media as recited in claim 15, wherein the instructions use tournament game rules during tournament game play of the pinball machine.

17. A computer readable media conducting a multiple player tournament utilizing an amusement game, comprising:

for each of the multiple players playing the amusement game during the tournament:

firstly adding a game playing score achieved by a current player of the amusement game to previous game playing scores achieved by the current player of the amusement game to determine a cumulative actual game playing score total for the player of the amusement game during the tournament;

secondly comparing the cumulative actual game playing score total for the current player of the amusement game against cumulative actual game playing score totals for other players of the amusement game during the tournament to determine if the current player of the amusement game has achieved a cumulative actual game playing score total that qualifies the current player of the amusement game as a potential cumulative actual game playing score prize recipient; and thirdly comparing the game playing score achieved by the current player of the amusement game against a threshold game playing score for the tournament only when it has been determined that the current player of the amusement game failed to have a cumulative actual game playing score total that qualifies the current player of the amusement game as a potential cumulative actual game playing score prize recipient and, when the player of the amusement game achieves the threshold game playing score for the tournament, placing the current player of the amusement game onto a bump board listing from which the current player of the amusement game can be bumped by at least other players of the amusement game achieving the threshold game playing score for the tournament;

wherein the threshold game playing score for the tournament has a non-zero value that is initially established prior to the tournament and prior to game playing scores being achieved by any of the multiple players of the amusement game during the tournament.

18. The computer readable media as recited in claim 17, wherein the instructions add the game playing score achieved by the current player of the amusement game to previous game playing scores achieved by the current player of the amusement game to determine the cumulative actual game playing score total for the current player of the amusement game only when the game playing score achieved by the current player of the amusement game achieves the threshold game playing score for the tournament.

19. The computer readable media as recited in claim 17, wherein the threshold game playing score for the tournament remains constant throughout the tournament.

20. The computer readable media as recited in claim 17, wherein the threshold game playing score for the tournament periodically changes throughout the tournament.

21. The computer readable media as recited in claim 20, wherein the threshold game playing score for the tournament is manually changed.

22. The computer readable media as recited in claim 20, wherein the threshold game playing score for the tournament is automatically changed.

23. The computer readable media as recited in claim 17, wherein the threshold game playing score for the tournament is selected to achieve a desired churn of at least players on the bump board.

24. The computer readable media as recited in claim 23, wherein the instructions periodically adjust the threshold game playing score for the tournament when it is determined that the desired churn is not being achieved.

25. The computer readable media as recited in claim 17, wherein at least the game playing score achieved by the current player of the amusement game is received at a central location for use in the steps of comparing.

26. The computer readable media as recited in claim 25, wherein at least the game playing score achieved by the current player of the amusement game is transmitted to the central location via a network.

27. The computer readable media as recited in claim 26, wherein the network comprises the Internet.

28. The computer readable media as recited in claim 17, wherein the instructions display the threshold game playing score for the tournament to attract potential players of the amusement game.

29. The computer readable media as recited in claim 17, wherein the amusement game comprises a pinball machine.

30. The computer readable media as recited in claim 29, wherein the instructions use tournament game rules during tournament game play of the pinball machine.

31. The computer readable media as recited in claim 17, wherein, when the current player of the amusement game first achieves a cumulative actual game playing score total that qualifies the current player of the amusement game as a potential cumulative actual game playing score prize recipient, a different player of the amusement game is moved from a listing of potential cumulative actual game playing score prize recipients to the bump board listing.

32. The computer readable media as recited in claim 17, where adding a player to the bump board listing causes a removal of a player previously on the bump board listing.

33. The computer readable media as recited in claim 32, wherein players are added to a top of the bump board listing causing a removal of players from a bottom of the bump board listing.

34. The computer readable media as recited in claim 32, wherein players are added to a bottom of the bump board listing causing a removal of players from a top of the bump board listing.

35. The computer readable media as recited in claim 17, wherein the instructions display cumulative game playing scores of players of the amusement game qualified as potential cumulative actual game playing score prize recipients.

36. The computer readable media as recited in claim 35, wherein the instructions hide cumulative game playing scores of players of the amusement game positioned on the bump board.

37. The computer readable media as recited in claim 36, wherein the instructions allow access to a cumulative game playing score of a player on the bump board in response to an entered password.

* * * * *